United States Patent [19]

Schneiderat

[11] Patent Number: 5,029,781
[45] Date of Patent: Jul. 9, 1991

[54] DEVICE FOR SUSPENDING AND SECURING PIPES

[76] Inventor: Johann Schneiderat, Im Niederbruch 13, 4232 Xanten, Fed. Rep. of Germany

[21] Appl. No.: 523,636

[22] Filed: May 14, 1990

[30] Foreign Application Priority Data

May 13, 1989 [DE] Fed. Rep. of Germany ....... 3915769

[51] Int. Cl.$^5$ .............................................. F16L 3/00
[52] U.S. Cl. .................................................... 248/62
[58] Field of Search ....................... 248/62, 63, 64, 61, 248/60, 58, 317

[56] References Cited

U.S. PATENT DOCUMENTS

| 2,053,729 | 9/1936 | Miller | 248/58 X |
| 2,177,816 | 10/1939 | Wertman | 248/60 X |
| 2,942,820 | 6/1960 | Sherburne | 248/62 |
| 2,973,401 | 2/1961 | Taylor | 248/63 X |
| 4,240,602 | 12/1980 | McDonald | 248/62 X |
| 4,640,480 | 2/1987 | Semedard et al. | 248/62 |
| 4,714,229 | 12/1987 | Force et al. | 248/62 X |

FOREIGN PATENT DOCUMENTS

| 1236620 | 3/1967 | Fed. Rep. of Germany | 248/62 |
| 2516092 | 10/1976 | Fed. Rep. of Germany | 248/62 |
| 2617117 | 10/1977 | Fed. Rep. of Germany | 248/62 |
| 2127126 | 4/1984 | United Kingdom | 248/60 |

Primary Examiner—Ramon O. Ramirez
Attorney, Agent, or Firm—Sprung, Horn, Kramer & Woods

[57] ABSTRACT

A device for suspending and securing pipes with a straight suspending bracket that rests against the outer surface of the pipe with its edge paralleling the longitudinal axis of the pipe and has holes bored through its sides at an angle to its midplane, with a straight connecting bracket that rests against the pipe diametrically opposite the suspending bracket with its edge paralleling the longitudinal axis of the pipe and has holes bored at an angle through its sides, and with enough securing shackles on each side of the pipe with their ends extending through the holes in the suspending bracket and in the connecting bracket. Whereby spacers are mounted over the ends with one face flat against the sides of the suspending bracket and connecting bracket and nuts are screwed onto the ends, forcing the suspending bracket, the connecting bracket, and the securing shackles against the outer surface of the pipe. The suspending bracket has a suspension component. Friction bearings can be positioned against the suspending bracket and connecting bracket to support them horizontally and vertically.

19 Claims, 8 Drawing Sheets

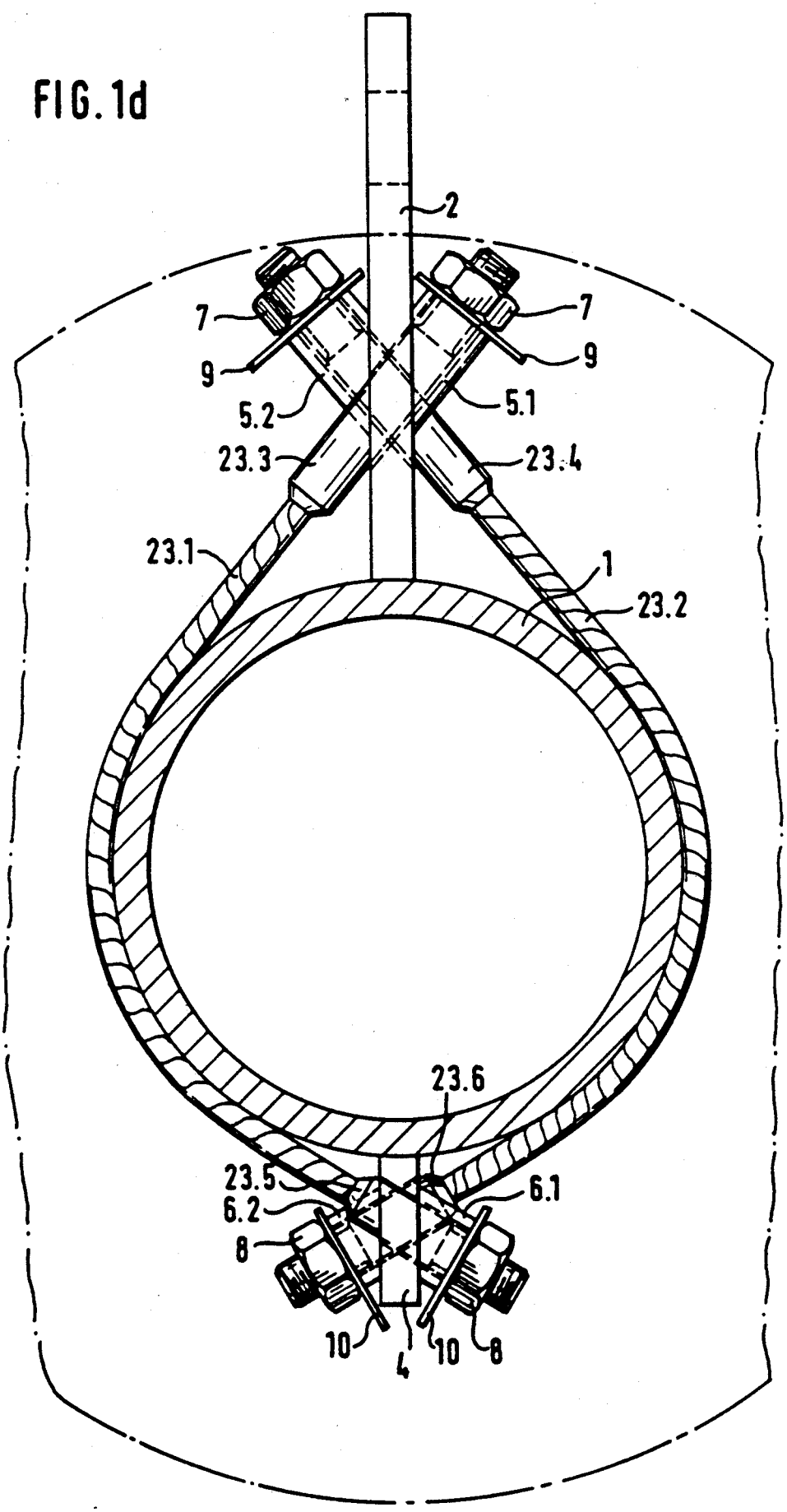

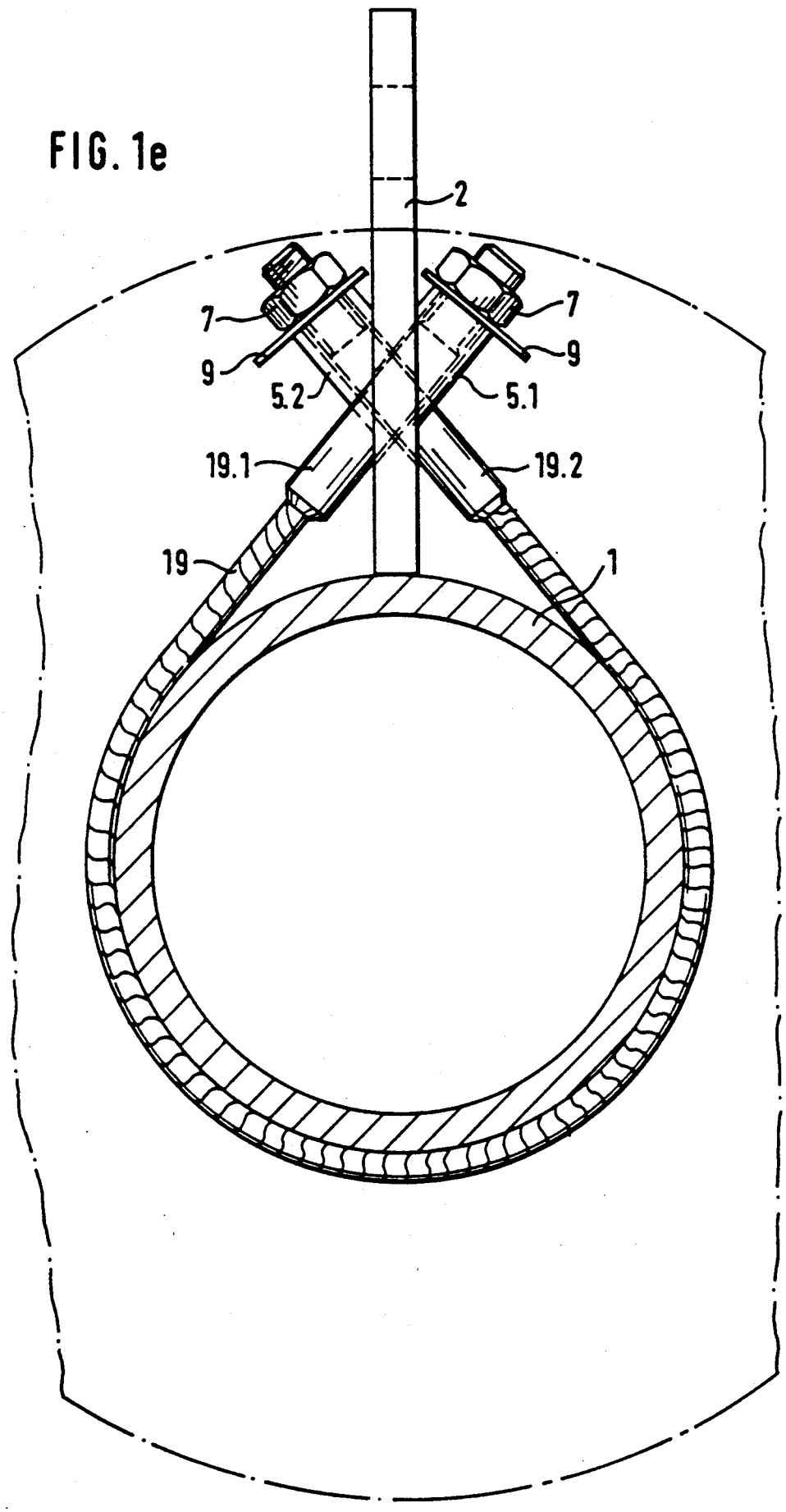

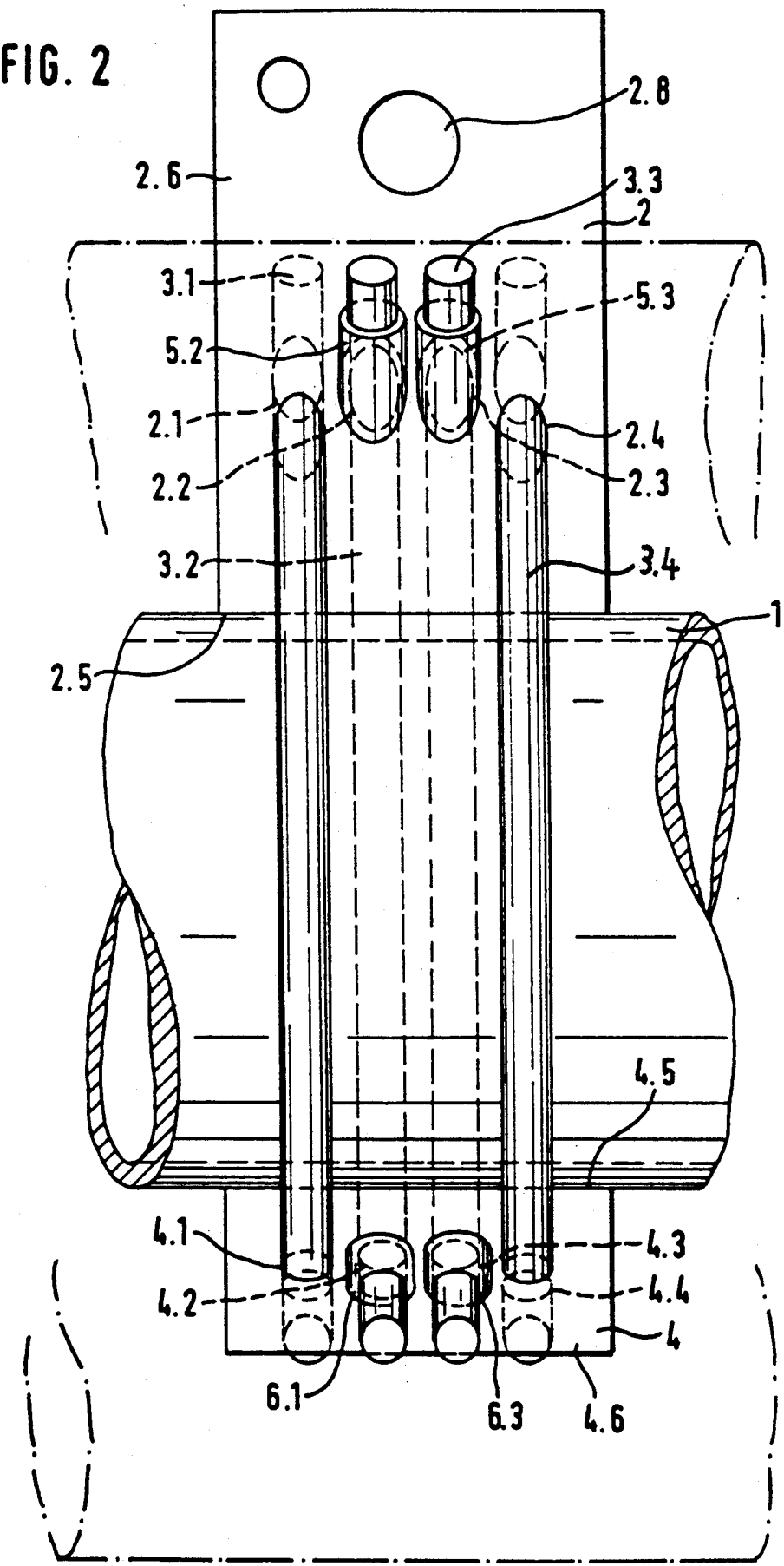

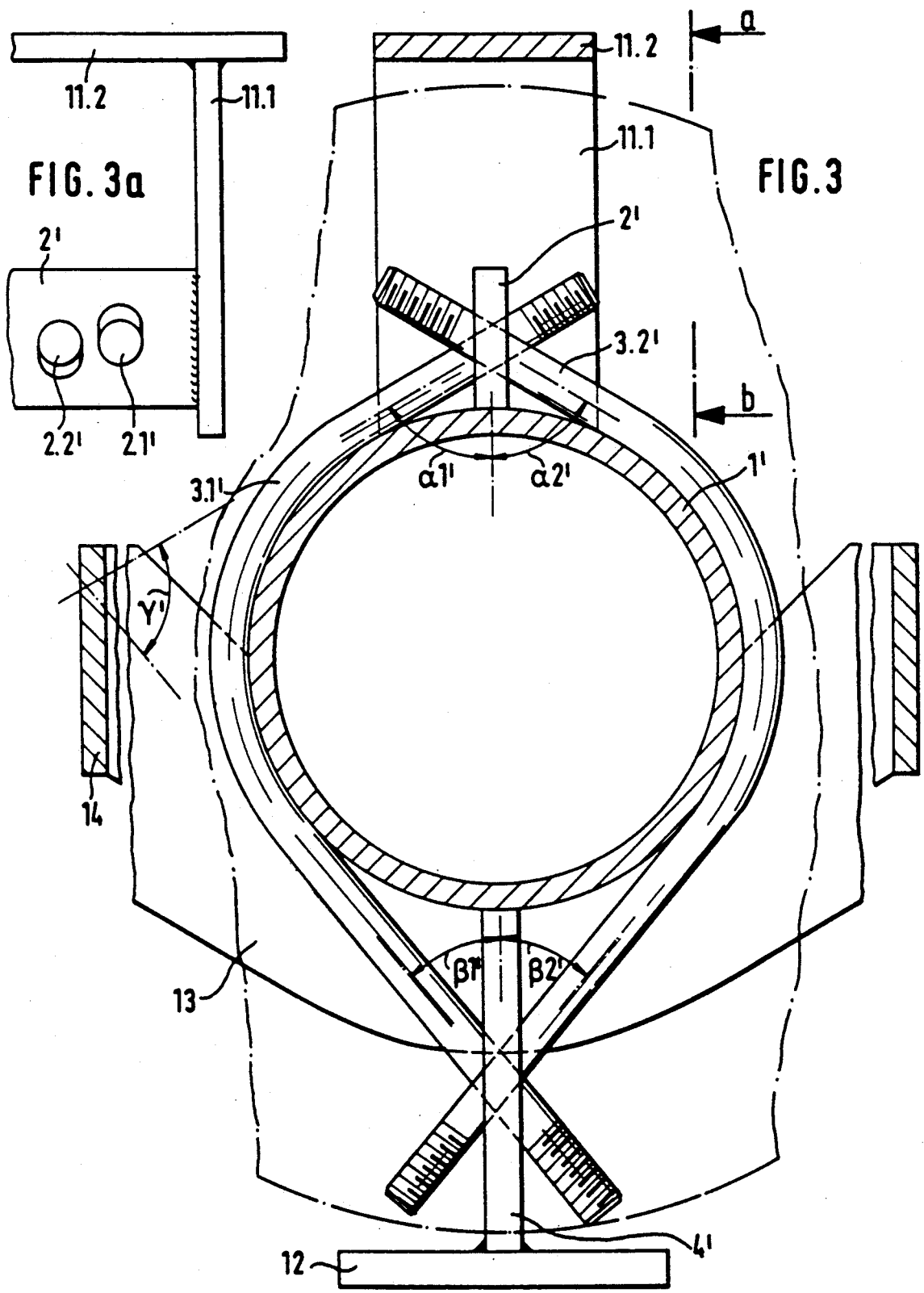

FIG. 4
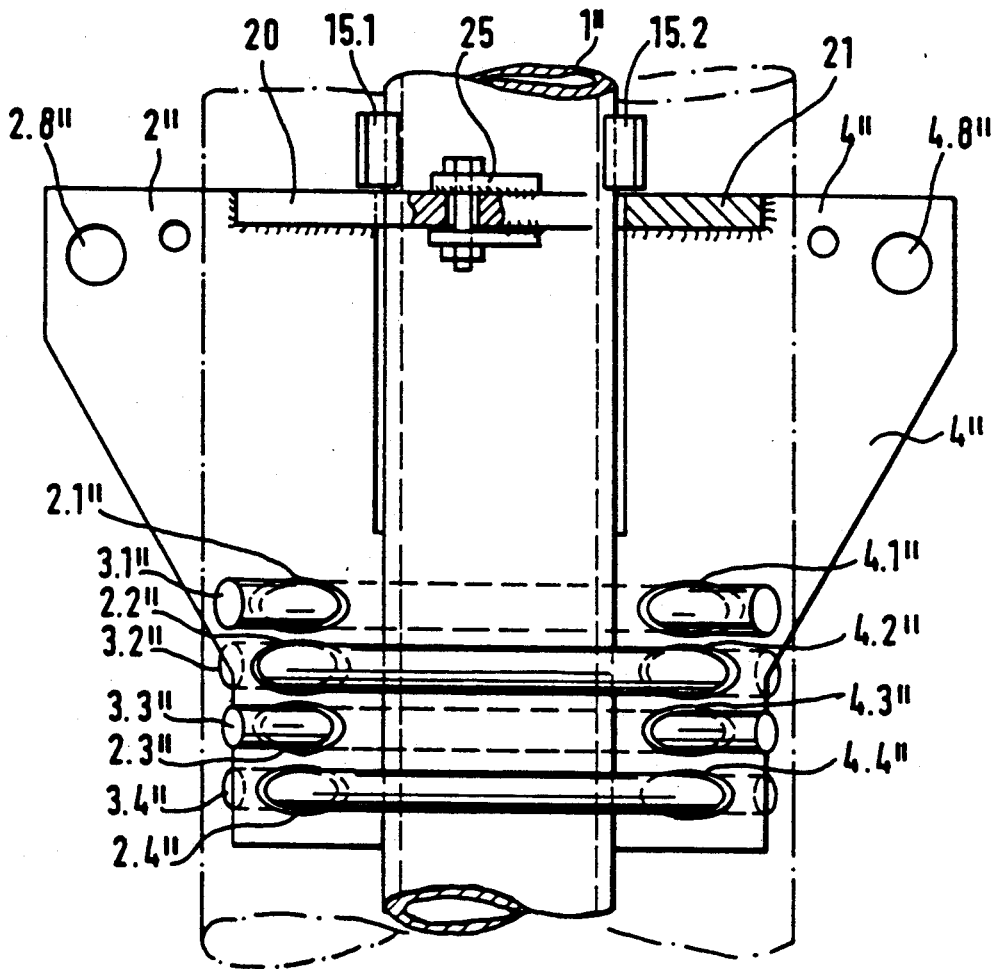
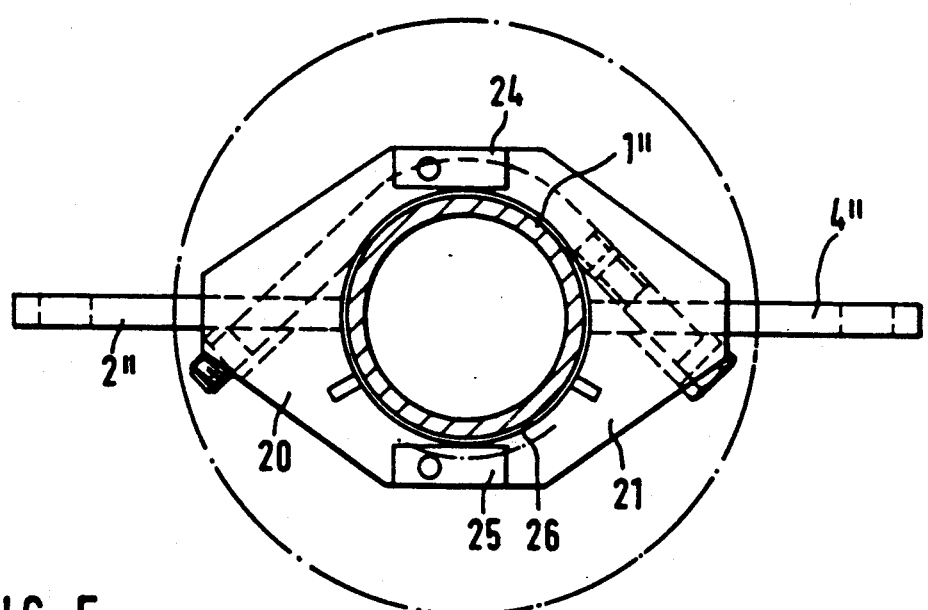
FIG. 5

DEVICE FOR SUSPENDING AND SECURING PIPES

BACKGROUND OF THE INVENTION

The invention concerns a device for suspending and securing pipes with a suspension component that rests against the top of the pipe and has holes bored through it and with a securing component that can be positioned around the pipe and has a round cross-section and threaded ends that extend through the holes, whereby nuts can be screwed onto the ends to secure the securing component to the pipe.

Suspending and securing pipes with clips is known. Such clips generally consists of two flat straps of steel, each curved more or less into a semicircle and fastened to the other around the pipe. The two steel straps are then generally screwed together on each side of the pipe, which extends between them. Pipe clips of this type are extremely expensive and material-consuming, especially when manufactured for long-diameter pipes, because the straps must be thick and strong enough not to deform subject to the forces exerted by the suspended pipe. The materials are particularly expensive when the clips are made out of high-grade steel to prevent corrosion.

Devices for suspending and securing pipes of the type described initially with a suspension component that rests against the top of the pipe and has holes bored through it and with a securing component that can be positioned around the pipe and has a round cross-section and threaded ends that extend through the holes, whereby nuts can be screwed onto the ends to secure the securing component to the pipe are also known, whereby the component that rests against the pipe is a suspension block that extends across the longitudinal axis of the pipe and has holes bored through the ends, through which extend and are bolted together the ends of a strap that surrounds the pipe at a circumferential angle of 180°. These devices are generally called pipe-shackle clips and also consume a lot of material when they must accommodate powerful forces and their separate parts must be manufactured out of high-grade steel.

SUMMARY OF THE INVENTION

The object of the invention is to improve a device for suspending and securing pipes with the characteristics initially described to the extent that, while consuming very little material, it will be able to accommodate powerful forces and be simple and flexible to use.

This object is attained in accordance with the invention by wherein the suspension component is a straight suspending bracket that rests against the outer surface of the pipe with its edge paralleling the axis of the pipe and the holes are in the axis-parallel sides wherein the suspending bracket has at least two holes, each with its axis at an acute angle to the midplane of the suspending bracket looking toward the pipe such that at least the angles between two holes have opposite mathematical signs and spacers are mounted over the ends of the securing component before the nuts are screwed on, wherein the outside diameter of the spacers is longer than the diameter of the holes and the surface of the ends of the spacers that face the suspending bracket are cut to an angle such that they will rest flat against the bracket when they are in position.

Advantageous embodiments of the device in accordance with the invention are recited in the subsidiary claims.

The main component of the device for suspending and securing pipes in accordance with the invention is the suspension component in the form of a straight bracket that rests against the pipe not with its side extending across as is the case with the known device but with its edge extending lengthwise. The consequence of this design is that, since hardly any bending moments are exerted on the bracket, it will be able to accommodate powerful forces even though it consumes little material. As will be described in greater detail hereinafter, the holes are bored through the side of the suspending bracket at an angle that varies depending on the diameter of the pipe and on the forces to be accommodated. The ends of the securing component extend through the holes and are screwed tight, whereby the spacers that are interposed between the nut and the side of the suspending bracket and have one end cut off at an angle are particularly significant with respect to the transmission of forces. The securing element can be a steel cable that extends all the way around the pipe. One especially practical embodiment, wherein the securing component consists of two halves, are ferably shackles having threaded ends, one on each side of the pipe and extending halfway around it, connected together by a connector in the form of a straight connecting bracket resting against the pipe with its edge paralleling the axis of the pipe diametrically opposite the suspending bracket and with the same number of openings bored through its sides, which parallel the axis of the pipe, as there are through the suspending bracket, each hole with its axis at a prescribed acute angle to the midplane of the connecting bracket looking toward the pipe such that at least the angles of two holes have opposite signs and the threaded ends of the halves of the securing component extend through the holes in the connecting bracket and can be secured by screwing nuts onto them once spacers with an outside diameter that is longer than the diameter of the holes and with the surface of the ends that face the connecting bracket cut at an angle that ensures that they will rest flat against the bracket have been positioned over them. and described in greater detail hereinafter by way of example, has a securing component in the form of several shackles positioned on each side of the pipe and secured both to the suspending bracket and to a securing bracket that also rests with its edge extending longitudinally against the pipe diametrically opposite the suspending bracket. Embodiments with two or more securing shackles of this type on each side of the pipe have proven to be especially practical. These embodiments make it especially easy to install the device effectively.

Suspension components and supporting components, which can also constitute known friction bearings, can be positioned with structural simplicity on the suspending bracket and securing bracket of this embodiment.

The device for suspending and securing pipes in accordance with the invention differs in principle from conventional pipe clips and pipe-shackle clips and can, because of the way the embodiment with securing shackles in particular encloses the pipe in its grip, be considered a "pipe holder."

Embodiments of the new pipe holder will now be described in greater detail with respect to the enclosed drawings, wherein

BRIEF DESCRIPTION OF THE DRAWINGS

FIG. 1d is a view like that in FIG. 1 of a third version of the embodiment illustrated in that figure, FIG. 1e is a view like that in FIG. 1 of a fourth version of the embodiment illustrated in that figure, FIG. 2 is a side view of the embodiment of a pipe holder illustrated in FIG. 1, FIG. 3 is a view like that in FIG. 1 of a version of the pipe holder with a supporting component in the form of a friction bearing, FIG. 3a is a view of part of the embodiment illustrated in FIG. 3 along line a-b, FIG. 4 is a side view of an embodiment of a pipe holder for suspending vertical pipes, and FIG. 5 is a view of the embodiment illustrated in FIG. 4 along the axis of the suspended pipe.

DETAILED DESCRIPTION OF THE INVENTION

Figure 1:
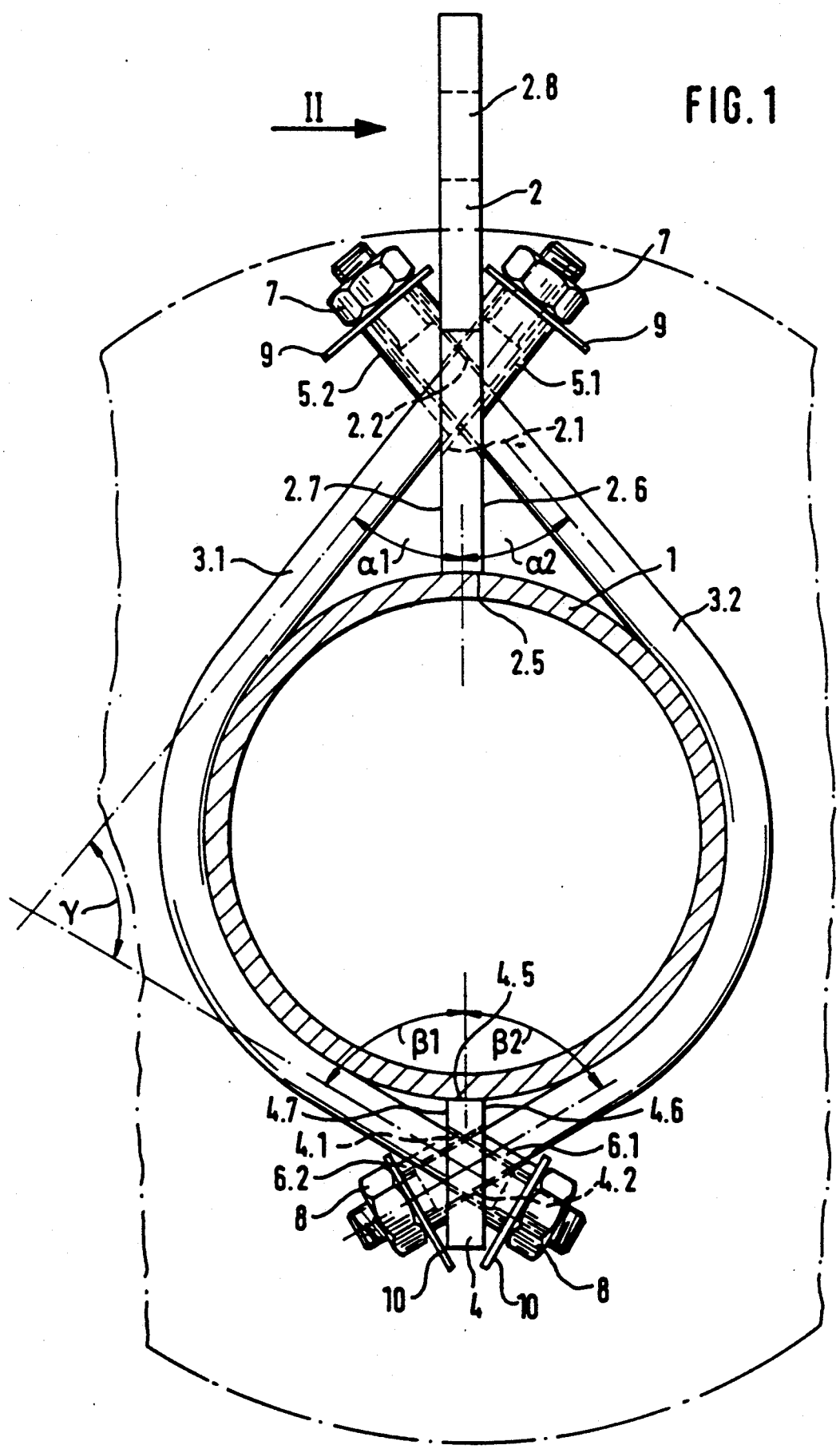
FIG. 1 is a view along the axis of the suspended pipe of one embodiment of the pipe holder.
Figure 1A:
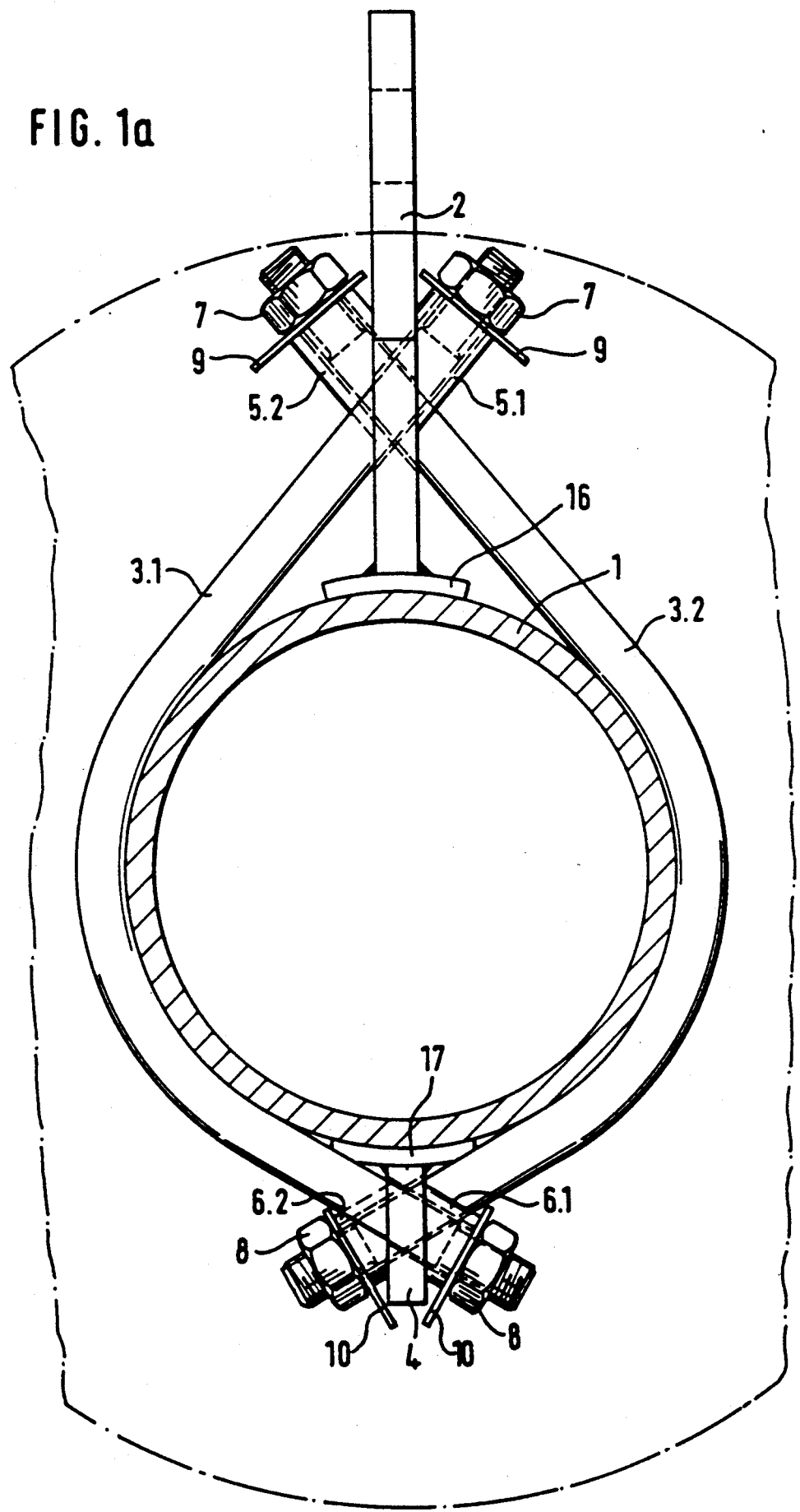
FIG. 1a is a view like that in FIG. 1 of one version of the embodiment illustrated in that figure.

A straight suspending bracket 2 rests with its edge 2.5 extending along the pipe 1 in the embodiment of a pipe holder illustrated in FIGS. 1 and 2. It is the top of pipe 1 that is contacted in the illustrated example, and sides 2.6 and 2.7 of suspending bracket 2 extend longitudinally and vertically. The edge can, as in the version illustrated in FIG. 1a, be expanded by interposing a web 16 that curves to match the circumference of the pipe in order to improve the distribution of forces and decrease the pressure against the outer surface of the pipe. At the top of suspending bracket 2 is an eye 2.8.

Diametrically opposite the suspending bracket 2 in the illustrated embodiment and resting against the bottom of pipe 1 is a straight connecting bracket 4 with its edge 4.5 extending along the pipe. The edge can, as in the version illustrated in FIG. 1a, be expanded by interposing a web 17 that curves to match the circumference of the pipe in order to improve the distribution of forces and decrease the pressure against the outer surface of the pipe. The edges 4.6 and 4.7 also extend along the pipe and vertically.

Bored at an angle through suspending bracket 2 are holes 2.1 through 2.4. The axes of holes 2.1 and 2.4 are at an acute angle $\alpha 1$ to the midplane of suspending bracket 2 along the pipe. Holes 2.2 and 2.3 are at an angle $\alpha 2$ to that plane. Angles $\alpha 1$ and $\alpha 2$ in the illustrated embodiment are an identical approximately 40° to 50° but with opposite mathematical signs.

Bored at an angle through suspending bracket 4 are holes 4.1 through 4.4. The axes of holes 4.1 and 4.4 are at an acute angle $\beta 1$ to the midplane of suspending bracket 4 along the pipe. Holes 4.2 and 4.3 are at an angle $\beta 2$ to that plane. Angles $\beta 1$ and $\beta 2$ in the illustrated embodiment are an identical approximately 60° to 70° but with opposite mathematical signs.

The threaded ends of securing shackles 3.1 through 3.4 extend through holes 2.1 to 2.4 and 4.1 to 4.4. Although there must be at least three securing shackles, there may also be more if necessary. The illustrated example has a total of four securing shackles, shackles 3.1 and 3.4 on one side (on the left in FIG. 1) and shackles 3.2 and 3.3 on the other side (on the right in FIG. 2) of pipe 1. Securing shackles 3.1 to 3.4 are curved such that their free ends are at an angle $\gamma$, approximately 80° in the illustrated example, to each other.

Mounted on the ends of the securing shackle that extend through the holes are spacers 5.1 through 5.4 and 6.1 through 6.4. The end of each spacer that faces the side of the suspending bracket or securing bracket is cut off at an angle that allows that end to rest flat against the side, whereas the other end of the spacer also rests flat against the nut 7 or 8. The longitudinal axes of the end surfaces of the spacers that face the sides of suspending bracket 2 and connecting bracket 4 are accordingly at the same angle to each other as are the axes of the holes to the midplane and hence to the sides of the suspending bracket and securing bracket. Spacers 5.1 through 5.4 and 6.1 through 6.4 transmit the forces exerted by the nuts on suspending bracket 2 and connecting bracket 4, with the force component dictated by angles $\alpha 1$ and $\alpha 2$ and $\beta 1$ and $\beta 2$ being transmitted to the surface of pipe 1.

Angles $\alpha 1$ and $\alpha 2$ and $\beta 1$ and $\beta 2$ can be adapted to the particular circumstances and are generally between 30° and 80°. The angle $\gamma$ between the ends of the securing shackle, generally between 50° and 100°, is adapted to those angles and to the circumference of the pipe. It is practical to secure nuts 7 and 8 with locking mechanisms. This can usually be accomplished with counternuts. The illustrated example employs an especially simple approach that consumes little material wherein washers 9 and 10 with appropriate openings are mounted on the adjacent and parallel ends of two securing shackles. Each washer has a flange that can be forced down against the outer surfaces of nuts 7 and 8 to prevent them from coming loose.

Nuts 7 and 8 and washers 9 and 10 have been left out of FIG. 2 in the interests of better illustrating the ends of securing shackles 3.1 to 3.4 that extend through holes 2.1 to 2.4 and 4.1 to 4.4.

FIGS. 3 and 3a illustrate an embodiment of a pipe holder that is similar in principle to the embodiment illustrated in FIGS. 1 and 2. Similar components are labeled with the same number plus a "prime" sign.

Resting on pipe 1' and longitudinally diametrically opposite each other are in suspending bracket 2' and a connecting bracket 4'. Brackets 2' and 4' are again fastened together by securing shackles. Shackle 3.1' is represented on the left and shackle 3.2' on the right of the pipe illustrated in FIG. 3. The ends of each securing shackle extended through holes bored through suspending bracket 2' and through connecting bracket 4'. Holes 2.1' and 2.2' are visible in FIG. 3a.

The nuts and washers are for simplicity's sake not illustrated in FIG. 3. The holes through suspending bracket 2' are at angles of $\alpha 1'$ and $\alpha 2'$ to its midplane. These angles are between approximately 60° and 70° and have opposite mathematical signs. The axes of the holes in connecting bracket 4' are at corresponding angles $\beta 1'$ and $\beta 2'$ to its midplane. These angles are between approximately 40° and 50° and have opposite mathematical signs. The angle $\gamma'$ between the free ends of securing shackles 3.1' and 3.2' is again approximately 50° to 100°.

As will be evident from FIGS. 3 and 3a, a sheet-metal upright 11.1 that functions in the capacity of a friction bearing and a plate 11.2 that extends longitudinally are mounted on suspending bracket 2'. Another plate 12 that extends longitudinally is fastened to the bottom of connecting bracket 4' for vertical support. Lateral support is provided by plates 14 mounted on uprights 13 with a concave edge that partly enclose the circumference of pipe 1'. Uprights 13 are secured to connecting bracket 4'.

The illustrated pipe holder can be employed to great advantage to suspend and secure pipes that are hotter than their environment because the relatively small interface between the pipe holder and the outer surface of the pipe severely reduces heat conduction between the pipe and the holder.

FIGS. 4 and 5 illustrate an embodiment of the pipe holder that is intended for suspending and securing vertical pipes or pipe sections. Similar parts are labeled with the same reference number double-prime.

A suspending bracket 2" and connection bracket 4" rest longitudinally against the vertical pipe 1" with their edges diametrically opposite each other. Connecting bracket 4" is, as will be evident from FIG. 4, identical with suspending bracket 2". Each has an eye 2.8" or 4.8" at the outer end.

Suspending bracket 2" has holes 2.1" to 2.4" bored through it and connecting bracket 4" holes 4.1" to 4.4" bored through it. The ends of securing shackles 3.1" to 3.4" extend through the holes. No screws or screw-locking mechanisms are illustrated in FIG. 4.

Although tightening the unillustrated nuts forces suspending bracket 2" and connecting bracket 4" securely against the surface of the pipe, generating considerable friction to secure the pipe, it is a good idea when suspending vertical pipes to provide additional security to prevent the pipe sliding through. This is done with shear blocks 15.1 and 15.2 that rest against the outer surface of pipe 1" and, as will now be described, against suspending bracket 2" and connecting bracket 4".

As will be evident from FIGS. 4 and 5, plate components 20 and 21 that parallel the cross-section of pipe 1" rest against the top of suspending bracket 2" and connecting bracket 4". These components are associated while being mounted against suspending bracket 2" and connecting bracket 4" and can be connected by connectors 24 and 25, creating an annular plate that completely surrounds pipe 1". Shear blocks 15.1 and 15.2 rest directly against the plate comprised of components 20 and 21. The advantage of this design is that the forces transmitted by the shear blocks are accommodated along with the additional transverse forces resulting from any moments that might occur by the annular plate. Since a certain amount of play 26 is left between the inside diameter of plate 20 and 21 and the outside diameter of pipe 1", the pipe will neither dent nor constrict.

FIGS. 1b to 1e illustrate simplified versions of the embodiment of a pipe holder illustrated in FIGS. 1 and 2. Parts identical with those represented in FIG. 1 are labeled with the same reference numbers.

Figures 1B, 1C:
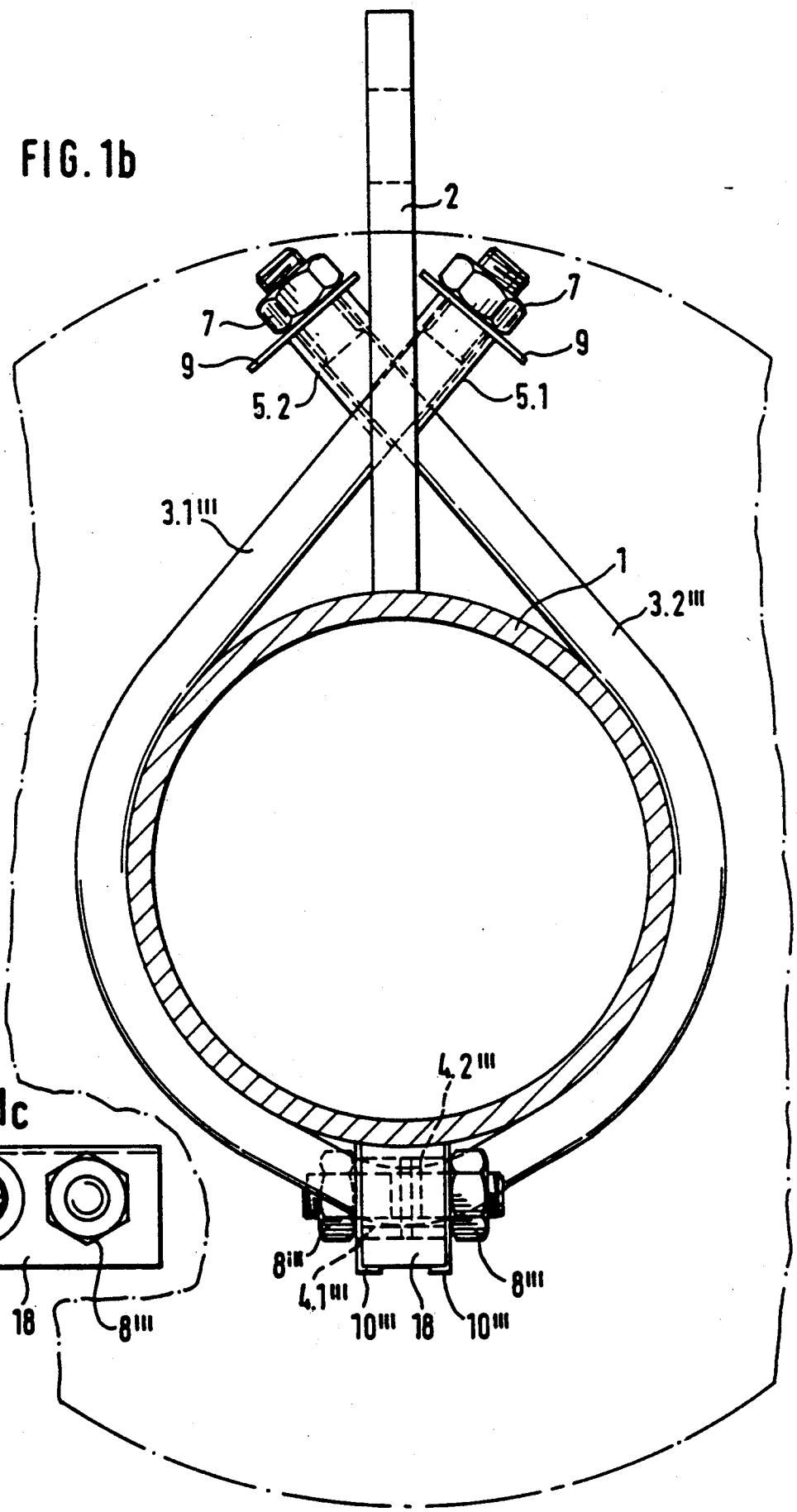
FIG. 1b is a view like that in FIG. 1 of another version of the embodiment illustrated in that figure.
FIG. 1c is a side view of part of the version illustrated in FIG. 1b.

The embodiment illustrated in FIG. 1b differs from that in FIG. 1 in that, instead of connecting bracket 4, a connector 18 rests against pipe 1 with its edge 18.1 extending longitudinally. Holes 4.1''' and 4.2''' are bored from side to side through connector 18. The axes of these holes, however, extend straight through rather than at an angle. the ends of securing shackles 3.1''' and 3.2''' remote from suspending bracket 2 extend through the holes in connector 18. To allow the ends to extend through without being bent, the section 18.1 of each hole 4.1''' and 4.2''' where the end of the shackle enters is enlarged. The ends of securing shackles 3.1''' and 3.1''' are threaded and have nuts 8''' screwed over them. The nuts are secured as previously described herein with lock washers 10.

FIG. 1d illustrates an embodiment that differs from the one illustrated in FIG. 1 only in that securing shackles 3.1 to 3.4 are replaced by securing structures in the form of steel cables 23.1 and 23.2 with threaded sleeves 23.3 and 23.5 and 23.4 and 23.6 secured to the ends. The sleeves extend through holes bored through suspending bracket 2 and connecting bracket 4, and nuts 7 and 8 are screwed over the ends and secured with lock washers 9 and 10. This embodiment is otherwise like the one illustrated in FIGS. 1 and 2.

Another simplified embodiment is illustrated in FIG. 1e. The securing structure in this embodiment is a single steel cable 19 that wraps all the way around the pipe and has threaded sleeves 19.1 and 19.2 at its ends. The sleeves extend through holes bored through suspending bracket 2 and are secured as described with reference to FIG. 1. This embodiment requires no component like connecting bracket 4.

What is claimed is:

1. A device for suspending and securing pipes comprising: a suspension component for resting against a top of a pipe to be suspended and having means forming holes therethrough and a securing component positionable around the pipe to be suspended and having a round cross-section and threaded ends that extend through the holes and nuts screwable onto the ends to secure the securing component to the pipe, wherein the suspension component comprises a straight suspending bracket positionable against an outer surface of the pipe with an edge paralleling an axis of the pipe and wherein the holes are in axis-parallel sides, wherein the suspending bracket has at least two of said holes, each hole having an axis at an acute angle to a midplane of the suspending bracket looking toward the pipe such that at least the angles between two holes have opposite mathematical signs and spacers mounted over the ends of the securing component in front of the nuts, wherein the spacers have an outside diameter which is longer than the diameter of the holes and a surface of the ends of the spacers that faces the suspending bracket is cut to an angle such that the spacers rest flat against the bracket and wherein the securing component comprises two halves, one positionable on each side of the pipe and extendable halfway around it and means connecting the two halves together comprising a connector configured as a straight connecting bracket restable against the pipe with an edge paralleling the axis of the pipe diametrically opposite the suspending bracket and with an equal number of openings therethrough in sides thereof which parallel the axis of the pipe as holes through the suspending bracket, each opening having an axis at a prescribed acute angle to the midplane of the connecting bracket looking toward the pipe such that at least the angles of two holes have opposite signs.

2. The device according to claim 1, wherein the acute angles between the axes of the holes and the midplane of the suspending bracket are all identical.

3. The device according to claim 2, wherein the acute angles are between 30° and 80°.

4. The device according to claim 1, wherein he acute angles between the axes of the openings and the midplane of the suspending bracket are all identical.

5. The device according to claim 5, wherein the acute angles are between 30° and 80°.

6. The device according to claim 5, wherein the halves of the securing component comprise steel cables with a threaded sleeve fastened to each end.

7. The device according to claim 5, wherein the halves of the securing component comprise shackles having threaded ends.

8. The device according to claim 7, wherein the shackles are bent such that their ends are at a mutual angle of 50° to 100°.

9. The device according to claim 5, wherein the suspending bracket and connecting bracket has at least three holes and openings respectively to accommodate at least three parts of the securing components.

10. The device according to claim 9, wherein the suspending bracket and connecting bracket has at least four holes and openings respectively to accommodate at least four parts of the securing component positioned in pairs and parallel to the opposite sides of the pipe.

11. The device according to claim 1, further comprising a suspension component resting against the suspending bracket.

12. The device according to claim 1, wherein the connecting bracket is identical to the suspending bracket and further comprising shear blocks positionable against an outside of the pipe, whereby the pipe also rests against the suspending bracket and the connecting bracket.

13. The device according to claim 1, further comprising friction bearings positioned for vertical support against at least one of the suspending bracket and the connecting bracket.

14. The device according to claim 13, wherein the friction bearings are positioned for horizontal support against at least one of the suspending bracket and the connecting bracket.

15. The device according to claim 1, wherein the nuts have locking structures.

16. The device according to claim 15, wherein there are at least two holes at angles that are identical in size and mathematical sign, and the locking structure comprises a lock washer with two holes for mounting over adjacent ends of parts of the securing components and two flanges, each of which can be forced against an outside of the nut to hold it in position.

17. The device according to claim 1, further comprising a web that is curved to match the circumference of the pipe and interposed between an edge of at least one of the suspending bracket and the connecting bracket and an outer surface of the pipe.

18. The device according to claim 12, further comprising plate components that parallel the cross-section of the pipe and rest against the top of the connecting bracket and the suspending bracket and connectors connecting together the plate components to constitute an annular plate that surrounds the pipe with the shear blocks on the outside of the pipe resting against them.

19. A device for suspending and securing pipes comprising: a suspension component for resting against a top of a pipe to be suspended and having means forming holes therethrough and a securing component positionable around the pipe to be suspended and having a round cross-section and threaded ends that extend through the holes and nuts screwable onto the ends to secure the securing component to the pipe, wherein the suspension component comprises a straight suspending bracket positionable against an outer surface of the pipe with an edge paralleling an axis of the pipe and wherein the holes are in axis-parallel sides, wherein the suspending bracket has at least two of said holes, each hole having an axis at an acute angle to a midplane of the suspending bracket looking toward the pipe such that at least the angles between two holes have opposite mathematical signs and spacers mounted over the ends of the securing component in front of the nuts, wherein the spacers have an outside diameter which is longer than the diameter of the holes and a surface of the ends of the spacers that faces the suspending bracket is cut to an angle such that the spacers rest flat against the bracket and wherein the securing component comprises two halves, one disposable on each side of the pipe and extending halfway around it, a connector connecting together the two halves and resting against the pipe with an edge paralleling the axis of the pipe diametrically opposite the suspending bracket and with the same number of holes through its sides, which parallel the axis of the pipe, as there holes are through the suspending bracket, each hole with its axis at a right angle to the sides and having an expansion where the halves enter them, whereby the threaded ends of the halves extend through the holes in the connector and are securable by nuts thereon.

* * * * *